United States Patent [19]

Vandewater

[11] 3,921,837
[45] Nov. 25, 1975

[54] ROUND BALE HANDLING ATTACHMENT FOR A TRACTOR

[76] Inventor: Lloyd L. Vandewater, R.R. No. 1, Dexter, Iowa 50070

[22] Filed: Feb. 12, 1975

[21] Appl. No.: 549,311

[52] U.S. Cl. .............. 214/145; 37/117.5; 214/750
[51] Int. Cl.² ............................................. E02F 3/81
[58] Field of Search .................. 214/145, 620, 750; 37/117.5

[56] References Cited
UNITED STATES PATENTS

| | | | |
|---|---|---|---|
| 2,597,374 | 5/1952 | Richey | 214/145 |
| 2,612,280 | 9/1952 | Stueland | 214/145 |
| 2,770,895 | 11/1956 | Rymkevitch | 37/117.5 |
| 2,814,402 | 11/1957 | Schaefer | 214/750 |
| 3,595,416 | 7/1971 | Perrotti | 214/145 |
| 3,834,567 | 9/1974 | Miller | 214/145 |

Primary Examiner—Robert J. Spar
Assistant Examiner—Ross Weaver
Attorney, Agent, or Firm—Rudolph L. Lowell

[57] ABSTRACT

The round bale handling attachment is adapted for assembly with the scoop of a tractor front end loader. A pair of fork members have rear sections secured to the scoop top wall in a spaced relation transversely of the tractor and front sections projected outwardly from the forward edge of the top wall. With the scoop tilted to a position wherein the top wall is horizontal, the fork members, on advance of the tractor, are insertable into one end or a side of a ground supported bale to a depth defined by the engagement of the bale end or side surface with the forward edge of the top wall and/or side walls of the scoop. When thus supported, the front end loader is operated in a usual manner for elevating the bale for transport to a storage location or feeding station.

4 Claims, 5 Drawing Figures

ROUND BALE HANDLING ATTACHMENT FOR A TRACTOR

SUMMARY OF THE INVENTION

The round bale handling attachment is of a simple and compact construction and comprised of a few parts adapted for ready and quick assembly with the scoop of a front end tractor loader. The mounting brackets for the fork members are rigidly secured to the upper surface of the top wall of the loader scoop in positions permitting a free and unobstructed use of the scoop during loader operation. The fork members are releasably connected with the mounting brackets by simple bolt or pin connections so that a change-over of the tractor loader for handling bales, or vice versa, is made with a minimum of effort and time. The bale handling operation for loading and transport purposes is accomplished by a usual manipulation of the tractor and the controls for the tractor front end loader.

DETAILED DESCRIPTION OF THE INVENTION

Figures 2, 3:
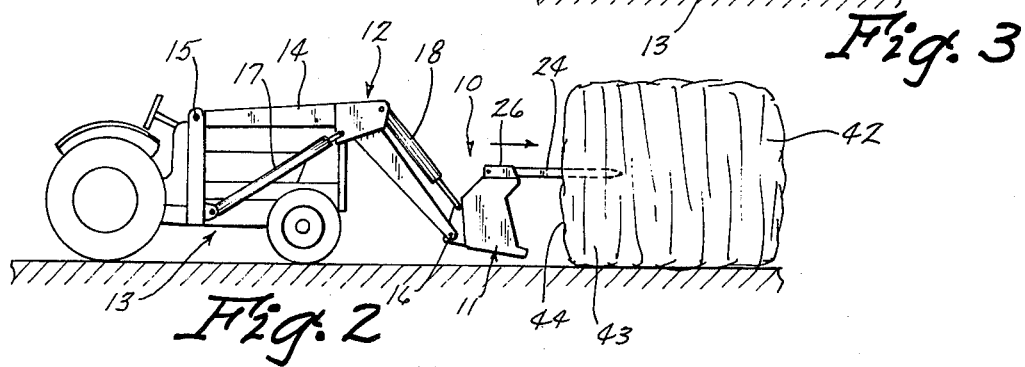
FIG. 2 is a diagrammatic side elevational view of a farm tractor equipped with the bale handling attachment showing a bale being loaded thereon.
FIG. 3 is illustrated similarly to FIG. 2 and shows the bale in an elevated position for loading into a truck or the like or in a tiered arrangement for storage purposes.

The round bale handling attachment of this invention, indicated generally at 10, is shown in FIGS. 2 and 3 in assembly relation with a scoop 11 of a usual front end loader 12 of a tractor 13. The tractor loader includes a pair of lift arms 14 extended longitudinally along opposite sides of the tractor with their rear ends pivotally supported at 15 on the tractor for up and down pivotal movement of the front ends thereof. The scoop 11 is pivotally supported at 16 between the front ends of the lift arms for pivotal movement about a horizontal axis. The lift arms 14 are pivotally moved up and down in unison by associated hydraulic cylinder assemblies 17. The scoop 11 is pivotally moved about the pivot supports 16 by hydraulic cylinder assemblies 18.

The scoop 11 (FIG. 1) is illustrated as being of substantially rectangular box shape having a top wall 19, back wall 21, bottom wall 22 and end walls 23. In a normal use of the scoop 11, during a loader operation, the scoop is pivoted to a position wherein the top wall 19 is substantially horizontal and located above the bottom wall 22. When loaded, the scoop is movable to an elevated position wherein the bottom and top walls are in substantially vertical positions.

The bale handling attachment 10 (FIG. 1) is comprised of a pair of fork members 24 and corresponding mounting members or brackets 26. Each fork member is comprised of a tubular or solid material of a rectangular or round shape in cross section. Secured to the front end 27 of a fork member 24 and projected forwardly therefrom is a pointed cap or plug 28 of a generally pyramidal shape having a shank of a rectangular shape in cross section extended outwardly from the base thereof. On reception of the shank 29 within the front end 27 of a fork member 24 the cap member 28 is secured to the fork member as by weldments.

Figure 1:
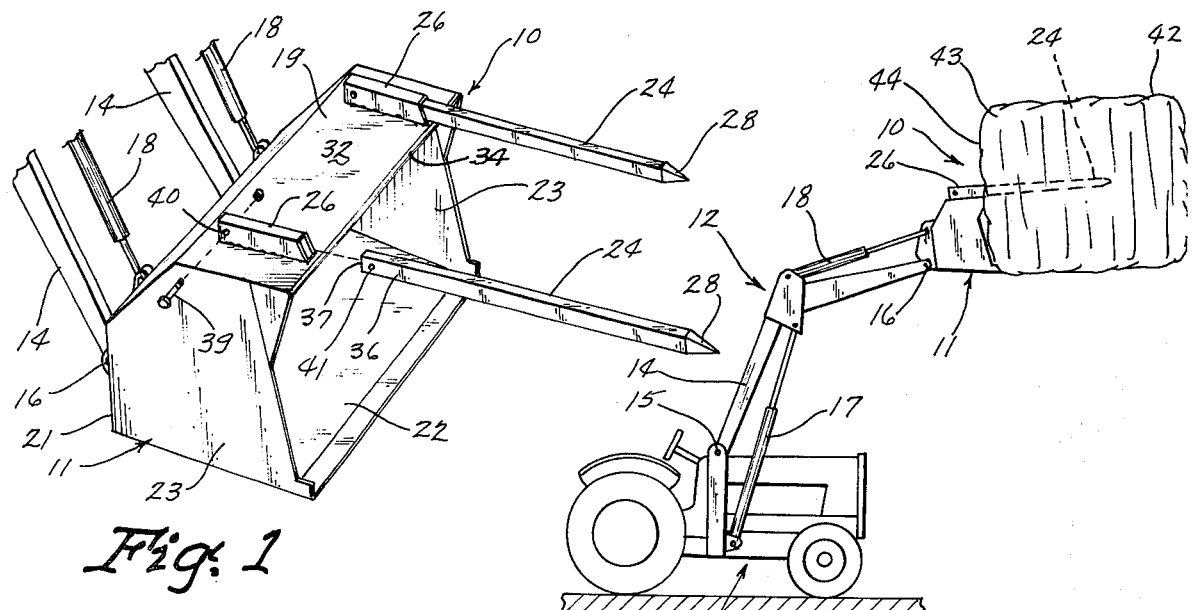
FIG. 1 is a front perspective view of the tractor loader scoop showing the assembly relation therewith of the round bale handling attachment of this invention.
Figure 4:
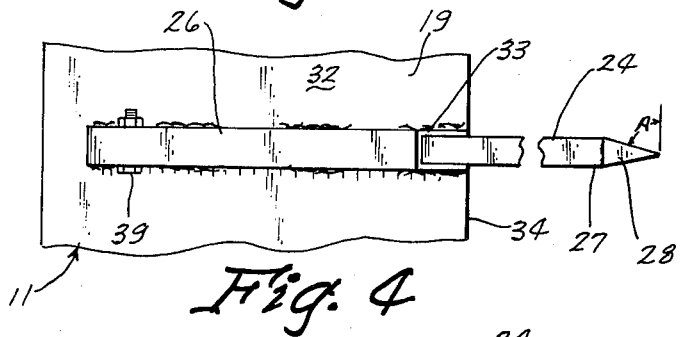
FIG. 4 is an enlarged detailed foreshortened plan view showing the assembly of a bale engaging fork with the top wall of the tractor loader scoop.
Figure 5:
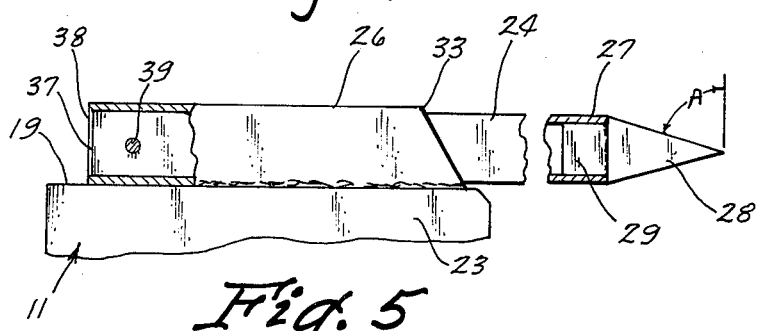
FIG. 5 is a side elevational view of the fork assembly of FIG. 4 with parts broken away.

A bracket or mounting member 26 is of a tubular construction and of a rectangular or round shape corresponding to but slightly larger in transverse cross section than a fork member 24. The brackets 26 are extended transversely of the upper surface 32 of the top wall 19 in a spaced relation transversely of the tractor 13 and are rigidly secured to the top wall as by weldments. As shown in FIGS. 4 and 5, a mounting member 26 is of a length substantially coextensive with the width of the top wall 19 with its upper end cut away, as indicated at 33, so as to be inclined downwardly and rearwardly from the forward edge 34 of the top wall 19 (FIG. 1). It will also be noted that the short side wall of a rectangular shaped mounting member 26 is secured to the scoop top wall 19.

A fork member 24 is assembled with a corresponding mounting bracket 26 (FIG. 1) by merely inserting the rear end 36 thereof within an associated mounting bracket 26 until the rear face 37 of the fork member is substantially flush with the rear face 38 of a bracket member 26. A bolt or pin assembly 39 is then inserted within aligned openings 40 and 41 extended transversely of a fork member and corresponding bracket member, respectively. When thus assembled, the front ends 27 of the fork members 24 are projected outwardly from the forward edge 34 of the scoop top wall 19.

In the handling of a round bale, indicated at 42, in a ground supported position, the scoop 11 (FIG. 2) is manipulated to the loading position therefor wherein the top wall is substantially horizontal and located above the bottom wall 22. With the fork members thus also extended horizontally, the tractor 13 is advanced toward the bale 42. If the bale is to be engaged in an end 43 the tractor is advanced axially of the bale 42 to insert the fork members within the bale end 43 to a depth defined by the engagement of the bale end face 44 with the forward edge of the scoop top wall, bottom wall or end walls. Where the bale 42 is to be supported transversely of the forks 24, the tractor would be advanced in a manner to insert the forks into the side of the bale. On a relative operation of the hydraulic cylinder assemblies 17 and 18, the bale is elevated to a position, shown in FIG. 3, such that it may be loaded onto a truck bed or ground supported bales for storage purposes. To transport a bale 42 from a storage position to a feeding lot it is only necessary that the bale be carried in a clearance relation with the ground surface.

In one embodiment of the invention, a mounting bracket 26 is formed of about a two inch by four inch tubular material to receive a corresponding fork member 24 that is formed of a one and one-half inch by three inch tubular material. In this embodiment, a mounting member 26 has a length of about twelve inches and a fork member a length of about forty-eight inches. A cap member 28 is about six inches long and each side thereof is tapered at an angle of about seventy-five degrees as indicated at A in FIGS. 4 and 5.

Although the invention has been described with respect to a preferred embodiment thereof, it is to be understood that it is not to be so limited since changes and modifications can be made therein which are within the

I claim:

1. A round bale handling attachment for a tractor with a front end loader which includes a pair of longitudinal pivoted lift arms arranged at opposite sides of the tractor with front end sections projected forwardly of the tractor and a scoop pivotally mounted between said front sections having a top wall horizontally positionable when the scoop is in a lowered position therefor, said attachment comprising:
   a. a pair of like elongated mounting members,
   b. means securing said mounting members to the upper side of said top wall extending longitudinally of and in a transversely spaced relationship to said tractor,
   c. a pair of fork members corresponding to said mounting members each of which has a rear section and a forward section projected horizontally forwardly from the front edge of said top wall when the top wall is in said horizontal position thereof, and
   d. means for connecting the rear section of a fork member with a corresponding mounting member,
   e. said fork members, when a bale is on the ground, being moved toward the bale for insertion therein in response to a forward travel of the tractor toward said bale.

2. The round bale handling attachment according to claim 1 wherein:
   a. the scoop has a bottom wall hving a forward edge which, when the scoop is in the lowered position therefor, is located below the forward edge of the top wall,
   b. said fork members movable within said bale to an extent defined by the engagement of said bale with the forward edge of said top wall and/or forward edge of said bottom wall.

3. The round bale handling attachment according to claim 1 wherein:
   a. the scoop has a pair of oppositely arranged end walls, each of which has a forward edge,
   b. said fork members movable within said bale to an extent defined by the engagement of said bale with the forward edge of said top wall and/or forward edges of said end walls.

4. The round bale handling attachment according to claim 1 wherein:
   a. said mounting members are of a tubular construction, and each rear section of a fork member is received in a telescopic relation within a corresponding mounting member, and
   b. said connecting means comprises a pin means extended transversely through each mounting member and corresponding rear section of a fork member.

* * * * *